Nov. 15, 1932.  W. B. WELLS  1,887,983
LIGHT SIGNAL
Filed July 1, 1930
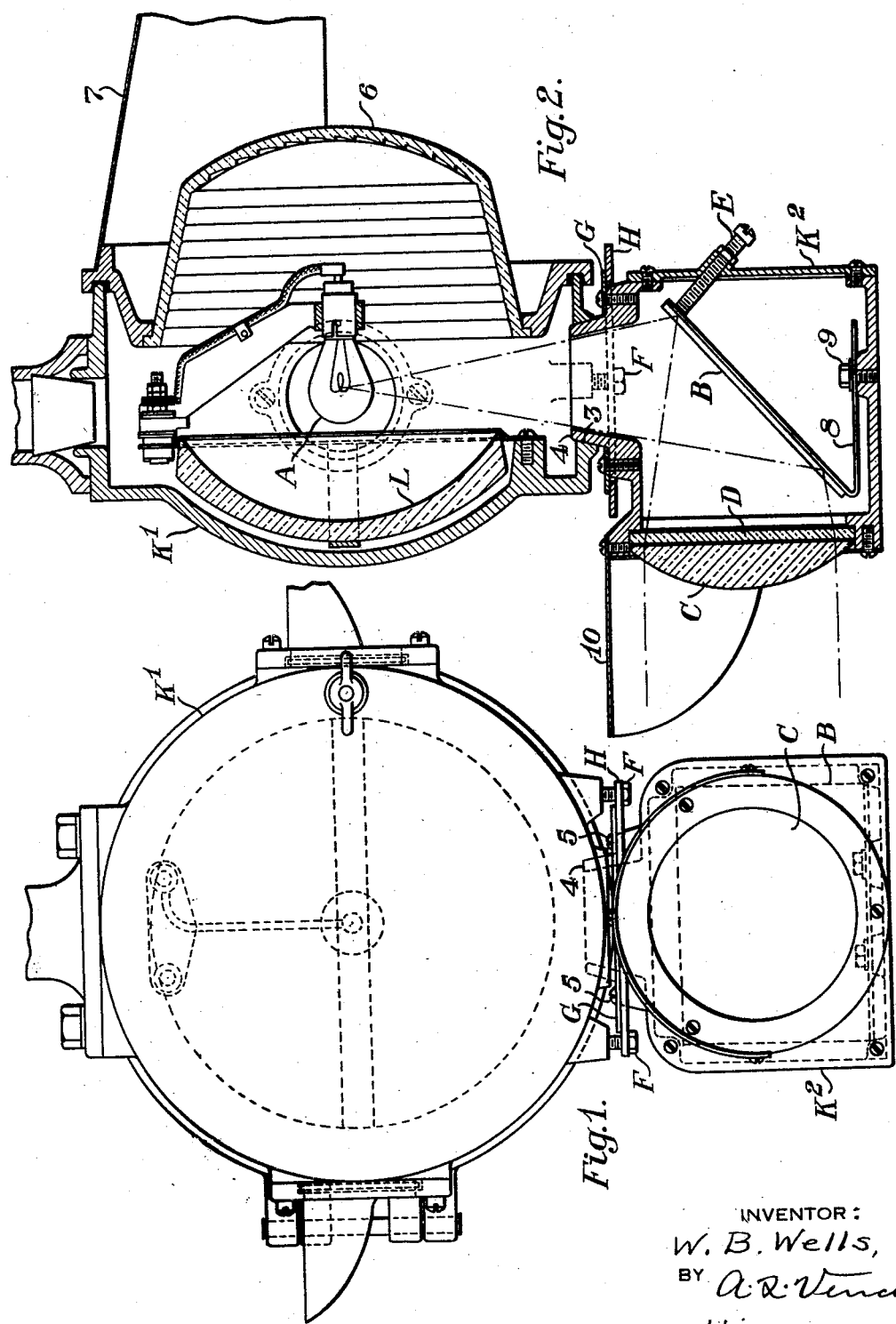
INVENTOR:
W. B. Wells,
BY A. R. Vencill
His ATTORNEY Patented Nov. 15, 1932

1,887,983

UNITED STATES PATENT OFFICE

WESLEY B. WELLS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

LIGHT SIGNAL

Application filed July 1, 1930. Serial No. 465,084.

My invention relates to light signals, and has for an object the provision of means for providing an adjustable backlight for signals of this character.

I will describe one form of signal embodying my invention, and will then point out the novel features thereof in claims.

In the accompanying drawing, Fig. 1 is a rear view showing one form of signal embodying my invention. Fig. 2 is a vertical sectional view taken on the center line of Fig. 1.

Similar reference characters refer to similar parts in each of the views.

Referring to the drawing, the signal comprises a main casing $K^1$, containing an electric lamp A. and a reflector L for projecting a horizontal beam of light from the lamp through a cover glass 6. The cover glass is provided with the usual hood 7 to shield the glass from the rays of the sun.

Located beneath the casing $K^1$ is an auxiliary casing $K^2$ containing a mirror B and a lens C for projecting a beam of light in the opposite direction to that of the beam which is projected by the reflector L. A colored screen D is preferably interposed between the mirror B and the lens C, and this screen will usually be red, so that a backlight projected by the signal will have this color.

The bottom of the main casing K is provided with a conical hole 3, the axis of which is vertical and passes through the filament of the lamp A. The auxiliary casing $K^2$ has a hollow conical stem 4, which fits the conical hole 3 in the main casing, this stem being located in the upper wall of the casing $K^2$.

The parts are so proportioned that part of the light from the lamp A passes directly downwardly through the conical stem 4 and strikes the mirror B, from which it is reflected through the lens C. That is to say, the vertical axis of the stem 4 coincides with the vertical axis of the hole 3, and this axis passes through substantially the center of the mirror B.

The mirror B is mounted on a flexible metal strip 8, which is attached to the lower wall of the casing $K^2$ by a bolt 9. The upper end of the mirror rests against a screw E which passes through the front wall of the casing $K^2$. It follows that by turning the screw E in and out, the angle which the mirror B makes with the vertical may be changed, thereby changing the angle between the horizontal and the beam of light projected by the lens C.

A ring G is attached to the upper surface of the auxiliary casing $K^2$ by means of screws 5, and this ring surrounds the conical stem 4. Located immediately beneath the ring G is a larger ring H, which overlaps the ring G and which may be attached to the upper casing $K^1$ by means of screws F. It follows that by loosening the screws F the casing $K^2$ may be rotated around a vertical axis with respect to the casing $K^1$, and that by tightening the screws F the auxiliary casing may be locked with respect to the main casing.

It will be seen from the foregoing that the beam of light projected by the lens C may be adjusted in the horizontal plane through an angle of 360°, and that this beam may be raised or depressed in the vertical plane by adjustment of the mirror B.

The auxiliary casing is provided with a hood 10 to protect the lens C from the rays of the sun.

Signals embodying my invention are particularly well adapted for highway crossing protection. In connection with this kind of protection, it is common practice to locate a signal on each side of the track facing away from the railroad and parallel with the highway. It frequently happens that a motorist stops so near the railroad that he no longer has a good view of the signal on his own side of the track. After the train has passed he may drive onto the track without having any further view of the signal, and if there are two or more tracks, there may be another train coming of which he is not aware. In accordance with my invention, the signal on the far side of the track will give a warning of an approaching train, thereby making it unnecessary for the motorist to stop far enough away from the railroad track to be able to see the indication given by the signal on his own side of the track.

When a signal embodying my invention is installed, the main indication given by the reflector L can be properly aligned, after which the auxiliary indication given by the lens C can be separately aligned without disturbing the alignment of the main beam. Another feature is that of the auxiliary indication utilizes no light which would be useful for the main beam. No phantom indication can be produced, because external light entering the signal through the cover glass 6 cannot produce an indication through the lens C, and, conversely, light entering the signal through the lens C cannot produce an indication through the cover glass 6.

Although I have herein shown and described only one form of light signal embodying my invention, it is understood that various changes and modifications may be made therein within the scope of the appended claims without departing from the spirit and scope of my invention.

Having thus described my invention, what I claim is:

1. A light signal comprising a main casing containing a lamp and means for projecting a beam of light therefrom in one direction, the bottom wall of said casing being provided with a conical hole the axis of which is vertical and passes through said lamp, an auxiliary casing the upper wall of which is provided with a hollow conical stem projecting into the hole in the main casing, the inner surface of said stem being a section of a cone the apex of which coincides with the light source of said lamp, a mirror supported in said auxiliary casing at an angle of substantially 45° from the vertical and receiving light from said lamp through said hole and said hollow stem, and means for attaching said auxiliary casing to said main casing to permit the former to be adjusted with respect to the latter around said vertical axis as a center.

2. A light signal comprising a main casing containing a lamp and means for projecting a beam of light therefrom in one direction, the bottom wall of said casing being provided with a conical hole the axis of which is vertical and passes through said lamp, an auxiliary casing the upper wall of which is provided with a hollow conical stem projecting into the hole in the main casing, the inner surface of said stem being a section of a cone the apex of which coincides with the light source of said lamp, a mirror supported in said auxiliary casing at an angle of substantially 45° from the vertical and receiving light from said lamp through said hole and said hollow stem, a ring attached to the top of said auxiliary casing and surrounding said stem, a second ring coacting with the under surface of the first ring, and means for attaching said second ring to said main casing, whereby the auxiliary casing may be adjusted around said vertical axis with respect to said main casing and may be locked in adjusted position.

In testimony whereof I affix my signature.

WESLEY B. WELLS.